United States Patent
Goering

(10) Patent No.: US 8,071,196 B2
(45) Date of Patent: Dec. 6, 2011

(54) REUSABLE WRAPPING MATERIAL FOR A CYLINDRICAL COTTON MODULE

(75) Inventor: Kevin Jacob Goering, Cambridge, IA (US)

(73) Assignee: Deere & Company, Moline, IL (US)

(*) Notice: Subject to any disclaimer, the term of this patent is extended or adjusted under 35 U.S.C. 154(b) by 305 days.

(21) Appl. No.: 12/405,526

(22) Filed: Mar. 17, 2009

(65) Prior Publication Data

US 2010/0239805 A1 Sep. 23, 2010

(51) Int. Cl.
*B32B 3/14* (2006.01)

(52) U.S. Cl. .......................... 428/100; 24/16 PB; 24/442

(58) Field of Classification Search .................... 428/57, 428/99, 100; 206/83.5; 24/16 PB, 442
See application file for complete search history.

(56) References Cited

U.S. PATENT DOCUMENTS

| | | | |
|---|---|---|---|
| 5,732,531 A * | 3/1998 | de Silva et al. | 53/416 |
| 6,787,209 B2 | 9/2004 | Mass et al. | |
| 6,984,431 B2 | 1/2006 | Mass et al. | |
| 2006/0101624 A1 | 5/2006 | Derscheid et al. | |

FOREIGN PATENT DOCUMENTS

| | | | |
|---|---|---|---|
| GB | 2221841 | | 2/1990 |
| GB | 2221841 A | * | 2/1990 |

* cited by examiner

*Primary Examiner* — Alexander Thomas

(57) ABSTRACT

A supply roll of durable plastic wrapping material for use with a wrapping mechanism for wrapping cylindrical cotton modules formed in a module-forming chamber of a cotton harvester is made in lengths connected in end-to-end relationship with Velcro® hook and loop connections provided at opposite ends of each length and having sufficient holding strength for the leading length to remain connected to the following length during the wrapping process, but for permitting the leading length to separate from the following length when the supply roll is subjected to a braking force. Other Velcro® hook and loop connections are provided on the lengths of material for securing them about the module with their placement being such to permit modules from 5' to 7.5' in diameter to be wrapped using no more than two wraps of material. The lengths of wrapping material may be mechanically stripped from the modules at the gin and cleaned and mechanically reattached in end-to-end relationship and formed into rolls for reuse.

6 Claims, 5 Drawing Sheets

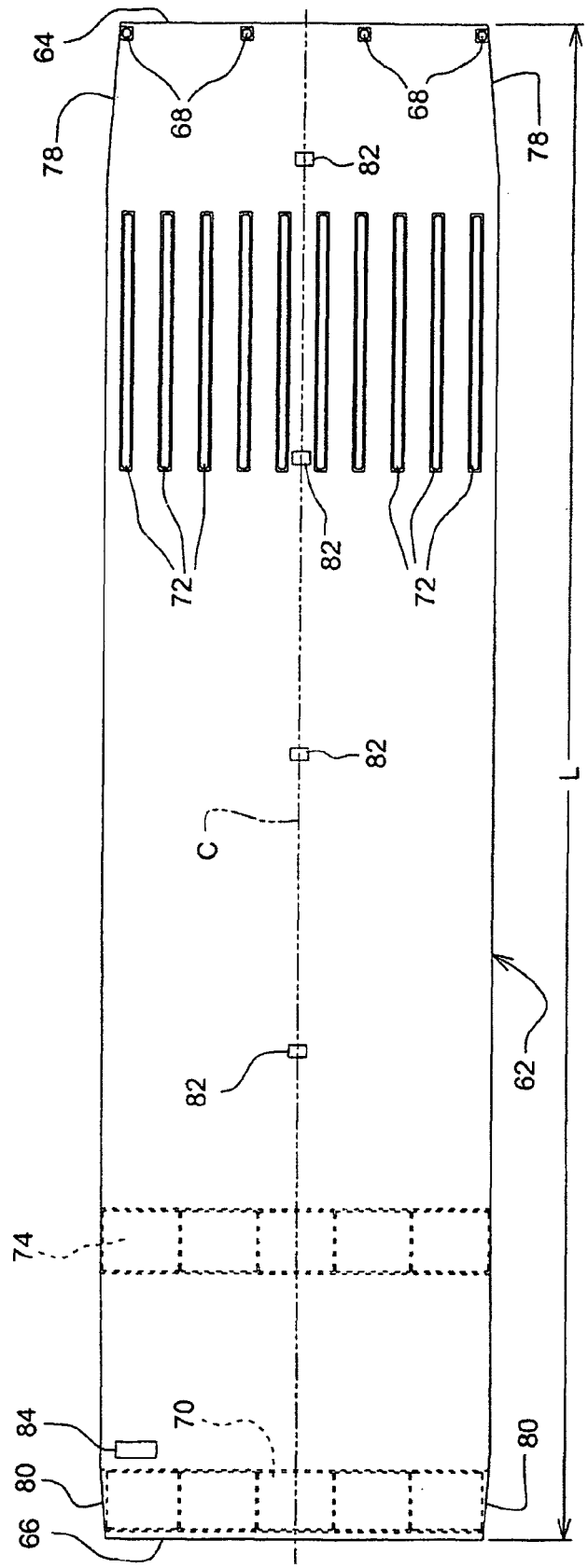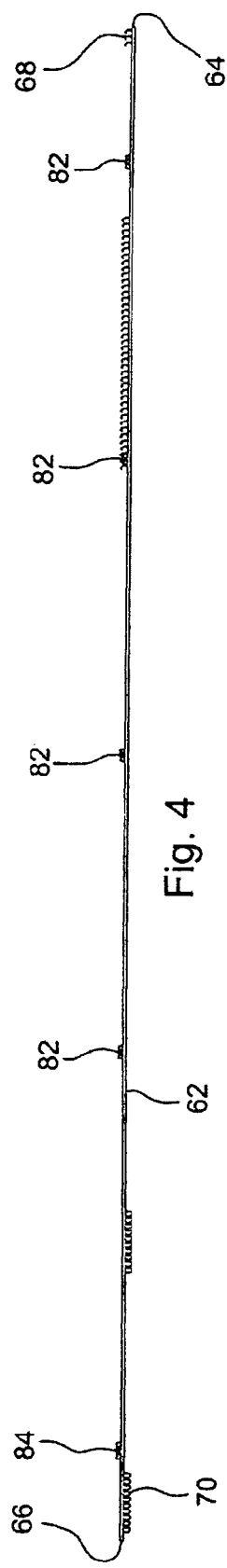
Fig. 3
Fig. 4

US 8,071,196 B2

REUSABLE WRAPPING MATERIAL FOR A CYLINDRICAL COTTON MODULE

FIELD OF THE INVENTION

The present invention relates to wrapping cylindrical modules of crop material, and more specifically, relates to a reusable protective wrapping material for wrapping modules of cotton.

BACKGROUND OF THE INVENTION

The current method of protecting cotton modules which have been compressed into large blocks, in a conventional manner, and left in the field is to place a protective tarp over the modules. These module tarps are removed and rolled up at the cotton gin where they are picked up by the growers and reused multiple times until the tarps wear out. The problem with this practice is that the tarps cover only the tops and sides of the modules leaving the bottoms of the modules subject to moisture and the like, which results in losses. To overcome this drawback, recent developments of module forming and wrapping devices have been incorporated in cotton harvesters which form cylindrical modules and wrap the entire peripheries of the modules with one-use plastic sheet material before discharging the modules onto the ground. While the entire circumference of the module is covered to protect it from rain, ground moisture and other contaminants, the wrapping material used requires each module to be wrapped with three to four layers of wrapping in order to hold the cotton together in the round module, which is problematic since the cost of this amount of wrapping material is quite expensive (currently about $35-$40), and, in addition, in fields with high yielding cotton it takes too long to wrap the module and the cotton harvester, which has an accumulator for holding cotton until the wrapping process is finished, has to stop or slow down to permit the module to be wrapped and ejected from the module-forming chamber since the accumulator fills up before the wrapping process is finished.

Another problem is that the wrapping material is supplied in rolls including separate Sections of wrapping material, each being of a length sufficient for wrapping a single Module, with the sections being connected end-to-end by folded adhesive joints which are pulled apart at the end of the wrapping process so as to expose adhesive on the tail of a wrapped section of wrapping material which causes the tail to sticks to a previously wrapped layer of the section of wrapping material so as to hold the wrapping material tight on the module. It has been found that the pre-applied adhesive, which must be weak enough to permit the tail to be separated from the wrapping material supply roll at the end of the wrapping process, is not strong enough to hold the tail in place in all conditions; especially When it is hot or there is contamination from leaf trash present U.S. Pat. No. 6,787,209 discloses a wrapping material supplied in rolls including sections of a length for wrapping a single module connected together end-to-end by pre-applied adhesive, in the above-described manner.

While it hat been proposed to apply Velcro® or Velcro®-type fastener strips to opposite ends of sections of plastic wrapping material for the purpose of securing the length of wrapping Material about a bale, it is not contemplated in these designs to use the Velcro® also as a connector for securing the lengths together in end-to-end relationship whereby the lengths can be gathered once used and reconnected together for reuse. Such a proposal is disclosed in UK Patent Application GB 2 221 841A, wherein, after use, the wrapping sections are gathered and connected together for reuse using adhesive strips. Another disclosure of Velcro® type material being used to secure plastic wrapping sections about a cylindrical module is found in Publication No. US 2006/0101624, dated 18 May 2006, wherein Velcro® is applied to discrete wrapping sections of one-use plastic wrapping material including net material, with the Velcro® including hooks or shapes designed for contacting underlying or overlying fiber elements of segments of the wrapping sections so as to fasten the wrapping material tightly around the circumference of the cylindrical item being wrapped.

The problem to be solved then is that of providing a reliable reusable plastic wrapping material suitable for wrapping cylindrical cotton modules.

SUMMARY OF THE INVENTION

According to the present invention there is provided a reusable plastic wrapping material for wrapping cotton modules, and more specifically, there is provided such a wrapping material which represents an improvement over that disclosed in the aforementioned UK Patent Application GB 2 221 841 A.

An object of the invention is to provide a plurality of sections of a durable plastic wrapping material which are connected in end-to-end relationship so as to form a roll of wrapping material to be used in a wrapping device and which can be gathered, easily cleaned and reliably reconnected and rolled into supply rolls for reuse once removed from cylindrical items wrapped with the lengths of wrapping material.

The foregoing object is achieved by providing a connecting zone defined by Velcro® loops located on one side of one end of each of the sections of wrapping material and by affixing Velcro® or Velcro®-type hooks to an opposite side of an opposite end of each of the sections of wrap material, with the amount of Velcro® hooks being sufficient for holding adjacent sections of wrapping material together in end-to-end relationship during the process of wrapping a leading one of the sections together, but for allowing the adjacent sections to be separated from each other by applying a braking force to a supply roll of wrapping material once all but a tail section of the leading section is wrapped about a rotating module. A minimum of further connecting zones are provided with Velcro® hooks and loops so as to secure the tail section to the underlying wrap material once the tail section is pulled into the module-forming chamber by the rotating module. The Velcro® hooks are unidirectional which makes the hooks easy to clean using a brush operating in a direction to pull cotton fibers straight off the hooks.

BRIEF DESCRIPTION OF THE DRAWINGS

FIG. 3 is an enlarged view of one of the wrapping material sections shown in FIG. 2.

FIG. 4 is a schematic side view of the wrapping material section shown in FIG. 3.

DESCRIPTION OF THE PREFERRED EMBODIMENT

Figure 1:
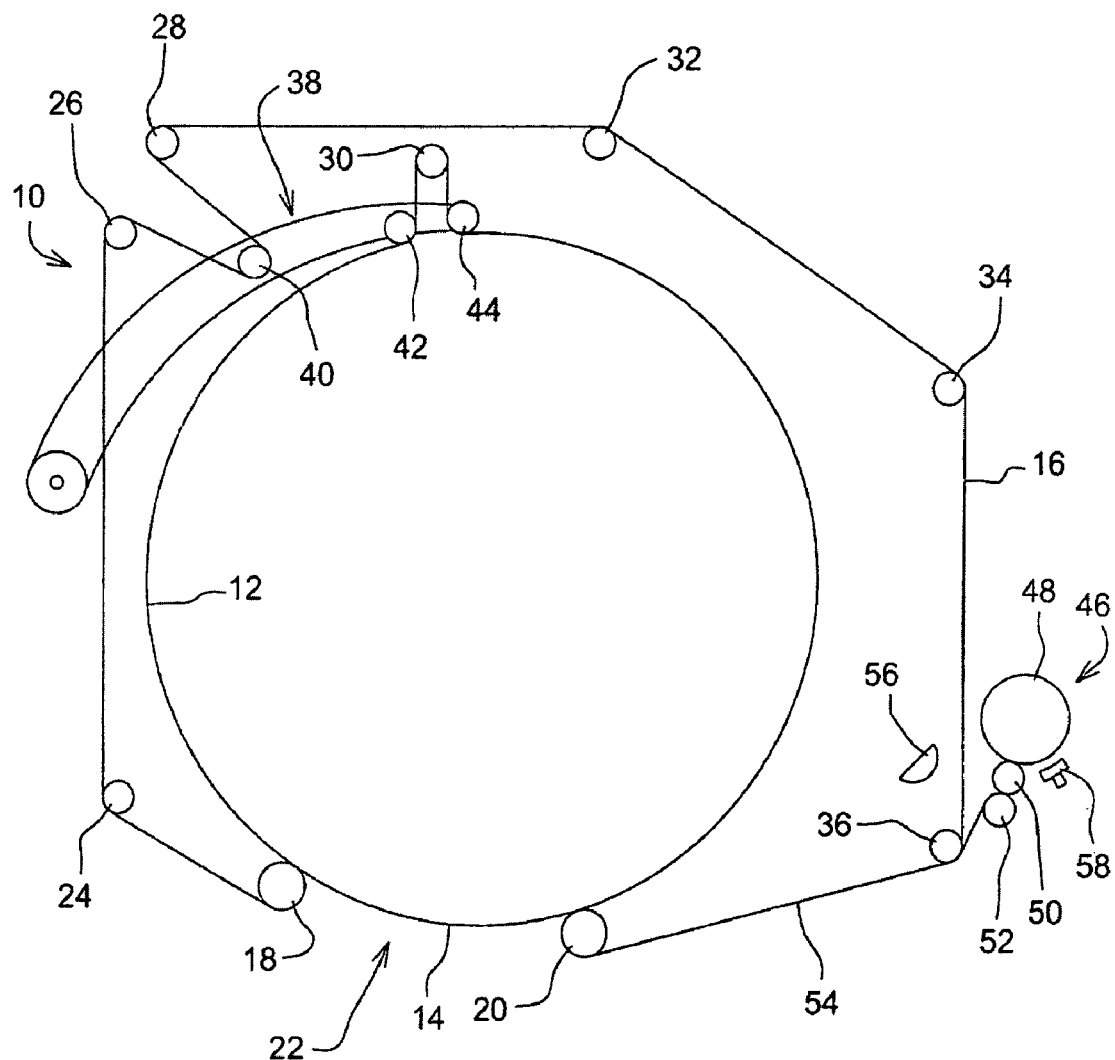
FIG. 1 is a schematic side view showing an expansible belt arrangement defining a module-forming chamber together with a portion of a wrap material feed mechanism for feeding wrapping material into the module-forming chamber for wrapping a module located there.

Referring now to FIG. 1 there is shown a module-forming chamber arrangement 10 including a chamber 12 containing a completed cylindrical module 14. The module-forming chamber includes a plurality of flexible belts 16 supported in side-by-side relationship to each other across a plurality of fixed rolls including bottom front and rear rolls 18 and 20, respectively, which delimit an inlet 22 of the chamber 10. Proceeding clockwise from the bottom front roll 18, are further fixed rolls including a lower front intermediate roll 24, an upper front intermediate roll 26, a top front roll 28, a top front intermediate roll 30, a top rear intermediate roll 32 an upper rear roll 34 and a lower rear roll 36. A belt tension arm assembly 38 has a front end pivotally mounted forwardly of a mid-height location of the module 14, with the arm assembly carrying a belt support roll 40 at a location intermediate opposite ends of the arm assembly, and carrying a pair spaced rolls 42 and 44 at its rear end. As is known in the art, an expansible loop of the belts 16 is formed between the fixed rolls 18 and 20, the loop extending between the rolls 42 and 44 and engaging the roll 30. A belt take-up loop is formed between the rolls 26 and 28 and is engaged with the roll 40. A hydraulic cylinder arrangement and/or a tensioning spring arrangement (not shown) are connected to the arm assembly 38 and would resist its movement from a lowered starting position, corresponding to when the baling chamber 12 is empty, to a raised position, corresponding to when the baling chamber 12 is full, as shown.

Located at the rear of the chamber arrangement 10 so as to be beside a vertical rear run of the belts 16 extending between the rolls 34 and 36 is a wrapping material supplying arrangement 46 including a wrapping material supply roll 48 which is located so as to bear against an upper wrapping material feed roll 50, which is driven and in engagement with a lower feed roll 52, so that by driving the upper feed roll 52 the rolls 50 and 52 are counter-rotated so as to feed wrapping material between them. At the beginning of a module wrapping sequence, the rolls 50 and 52 are caused to counter-rotate and propel an end of the wrapping material against the downwardly traveling rear run of the belts 16, the belts acting to carry the wrapping material to a pinch point defined between the belts 16, where they pass around the lower rear roll 36 and a material guide pan structure (not shown) extending beneath a run of the belts extending fore-and-aft between the rolls 36 and 20, the belts then acting to carry the wrapping material into the module-forming chamber 12 where the module 14, which is being rotated counter-clockwise by the belts 16 engages and carries along the wrapping material so as to cause the wrapping material to envelope the module. Once a section of the wrapping material having a length sufficient for placing a predetermined number of wraps on the module 14 has been conveyed through the feed rolls 50 and 52, as determined by a sensor 56, which could be an infrared (IR) sensor for example, when the sections of the wrapping material are provided with a reflective material tag, a brake mechanism 58 is actuated which prevents further rotation of the wrapping material supply roll 48 with an increase in tension in the wrapping material downstream of the rolls 50 and 52 occurring so as to cause the section of wrapping material being wrapped about the module 12 to become separated from the next adjacent section, in a manner described below.

Figure 2:
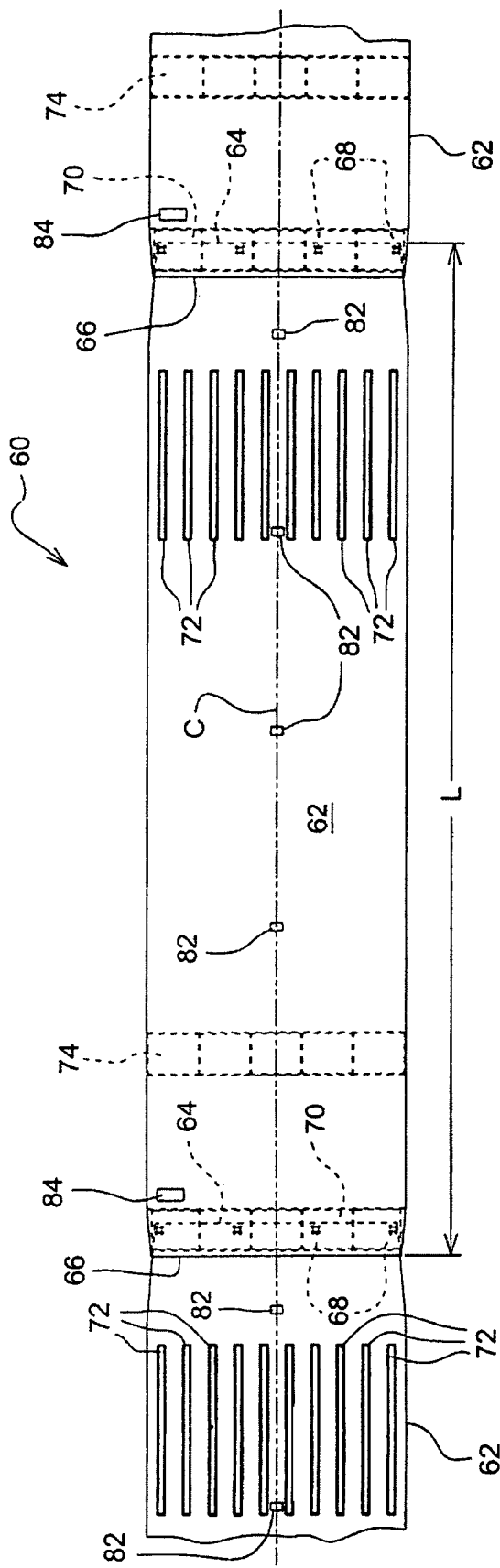
FIG. 2 is a top view showing a length of wrapping material comprising a plurality of sections connected together in end-to-end relationship to each other.

Referring now to FIG. 2, there is shown a length of wrapping material 60 comprising three identical wrapping material sections 62 having a length L connected together end-to-end in a manner described below. Each of the wrapping material sections 62 is constructed of a durable, moisture impermeable sheet of protective plastic material such as 12 oz., vinyl coated polyester, or equivalent, which is not stretchable, so it must be applied to the module 14 such that the circumferential speed of the module 14 during the wrapping process must be substantially equal to the speed that the wrapping material is delivered to the baling chamber 12. One supplier of such material is Seaman Corporation which sells the material as Shelter-Rite® tarp fabric. While lower weight material might have adequate durability to be suitable, these lower weights are not readily available in the market place. Higher weights would probably work fine, but have the drawback that not as many material sections 62 could be placed on a given wrapping material supply roll 48.

Referring now also to FIGS. 3 and 4, and as considered relative to being fed from a given wrapping material supply roll 48, each wrapping material section 62 includes a leading end 64 and a trailing end 66, with four equally spaced hook material squares 68 being secured to a top side of the section 62 at a location closely adjacent the leading end 64 in a linear pattern contained within a narrow leading end zone extending across the width of the wrapping material section 62. Secured to a bottom side of the wrapping material section 62 in a trailing end zone extending across the width of the section 62 at a location closely adjacent the trailing end 66 is a narrow loop material strip 70. The leading and trailing ends of adjacent wrapping material sections 62 are connected together with the hook material squares 68 being engaged with the loop material strip 70. The preferred hook material for attaching one wrapping material section 62 to the next is a RF weldable unidirectional hook, while the preferred loop material is Velcro® 3607 Loop material manufactured by Velcro® USA, with attachment of this loop material being possible by a RF, hot air or hot wedge welding processes, or by sewing.

It is important to note that the above-identified unidirectional hook material has several distinct advantages over non-directional hook material. First, and most important, it is easier to clean for reuse since any cotton which gets caught in the hook material can be brushed off by operating a brush in a direction away from the hook. Second, it provides the maximum holding power for a given contact area with loop material so that a minimal amount of the unidirectional hook material may be used, with the amount being sufficient for securing the ends of the wrapping material sections 62 together during the wrapping process so that the leading section will pull along the next adjacent section until the brake 58 is applied to the wrapping material supply roll 48, and then will become separated from the loop material without causing any damage to the wrapping material sections 62.

The loop material strip 70 also plays a apart in securing the wrapping material section 62 about a completed module 14. Specifically, provided for cooperating with the loop material strip 70 is a plurality of hook material strips 72 fixed to the top of the plastic sheet material in parallel relationship to each other and to a longitudinal center C of the of section 62, but which could be disposed in mirror image sets located at opposite sides of, and angled slightly to the longitudinal center C. The hook material strips 72 are located within a zone spaced to the left from the leading end 64 of the wrapping material section 62 by a distance equal to approximately 12% of the length L of the section 62 and having a length approximately equal to 17% of the length L, thus placing the hook material strips 72 within the leading third of the length of the material section 62. The hook material strips 72 each have a width approximately equal to the side dimension of the hook material squares 68.

In any event, the distance between the center of the loop material strips 70 and a location of the hook material strips 72 slightly beyond half the length of the strips 72 is equal to the circumference of the largest bale intended to be wrapped with the illustrated wrapping material section 62. The hook material strips 72 are preferably made of Velcro® HTH 719 Unidirectional Nylon hook material, which is not a weldable material, so it has to be sewn on.

An additional loop material strip 74 identical to the loop material strip 70 is secured across the underside of the wrapping material section 62 in parallel relationship to the strip 70 and at a location spaced from the strip 70 by a distance of approximately 13% of the length of the wrapping material section L, thereby making it possible to wrap a module having a diameter approximately 67%, or two-thirds, that of the maximum diameter intended to be wrapped with the illustrated wrapping material section 62, this being done by placing approximately two wraps of the wrapping material section 62 about the smaller module. Also, it is noted that the loop material strips 70 and 74 are located at a trailing zone within the trailing 20% of the length of the wrapping material section 62.

Except for leading and trailing end regions of the wrapping material sections 62, each of the sections has a width which is sufficient to provide full coverage of the circumference of the module 14 with some misalignment of the wrapping material section. The leading end region of the wrapping material section 62 has opposite corner regions 78 tapered over a distance of approximately 10% of the section length L with the width of the material section being diminished by approximately 6% due to the taper. The trailing end of the wrapping material section 62 is also tapered, with opposite corner regions 80 being tapered over a distance half that of the corner regions 78. The purpose of the tapered corner regions 78 and 80 is to reduce the amount of loose edge material and in that way increase the durability of the wrapping sections 62.

A feature of the wrapping material section 62 which lends to its use as a wrapping material for modules 14, is the provision of four RFID tags 82 located along the longitudinal center C of the material section 62, with the leading tag being spaced from the leading end of the section 62 by a distance substantially equal to the length of the tapered end region, and with the tags 82 being equally spaced from each other and located within approximately the leading two thirds of the length L. The RFID tags 82 are provided for being read by readers (not shown) associated with the module forming arrangement 10 for controlling wrapping operations. The tags 82 have other uses such as providing identification of the grower and for indicating which side of the wrapped module 14 would be best for being in ground contact after the wrapped module 14 is ejected from the module-forming chamber 12.

A further feature of the wrapping material section 62 which also lends to its use as a wrapping material for modules 14 is the provision of a visually discernable end marker 84 which leads, by a small distance, the loop material strip 70 adjacent the trailing end of the wrapping material section 62, the marker 84 being in the form of a rectangle made visible by making it of a polyester material coated with a vinyl material having a color which contrasts with the color of plastic sheet material making up the wrapping material section 62, the marker 84 being affixed to the section 62 by gluing, welding or sewing. The marker 84 will make it possible for the IR sensor 56 to sense when the trailing end of the wrapping material section 62 is passing through the feed rolls 50 and to generate and send a signal to a controller for controlling operation of the wrapping material roll brake 58 at the appropriate time for causing a leading wrapping material section 62 to become detached from the following section during wrapping of the leading wrapping material section about a given module 14 formed in the module-forming chamber 14.

Figure 5:
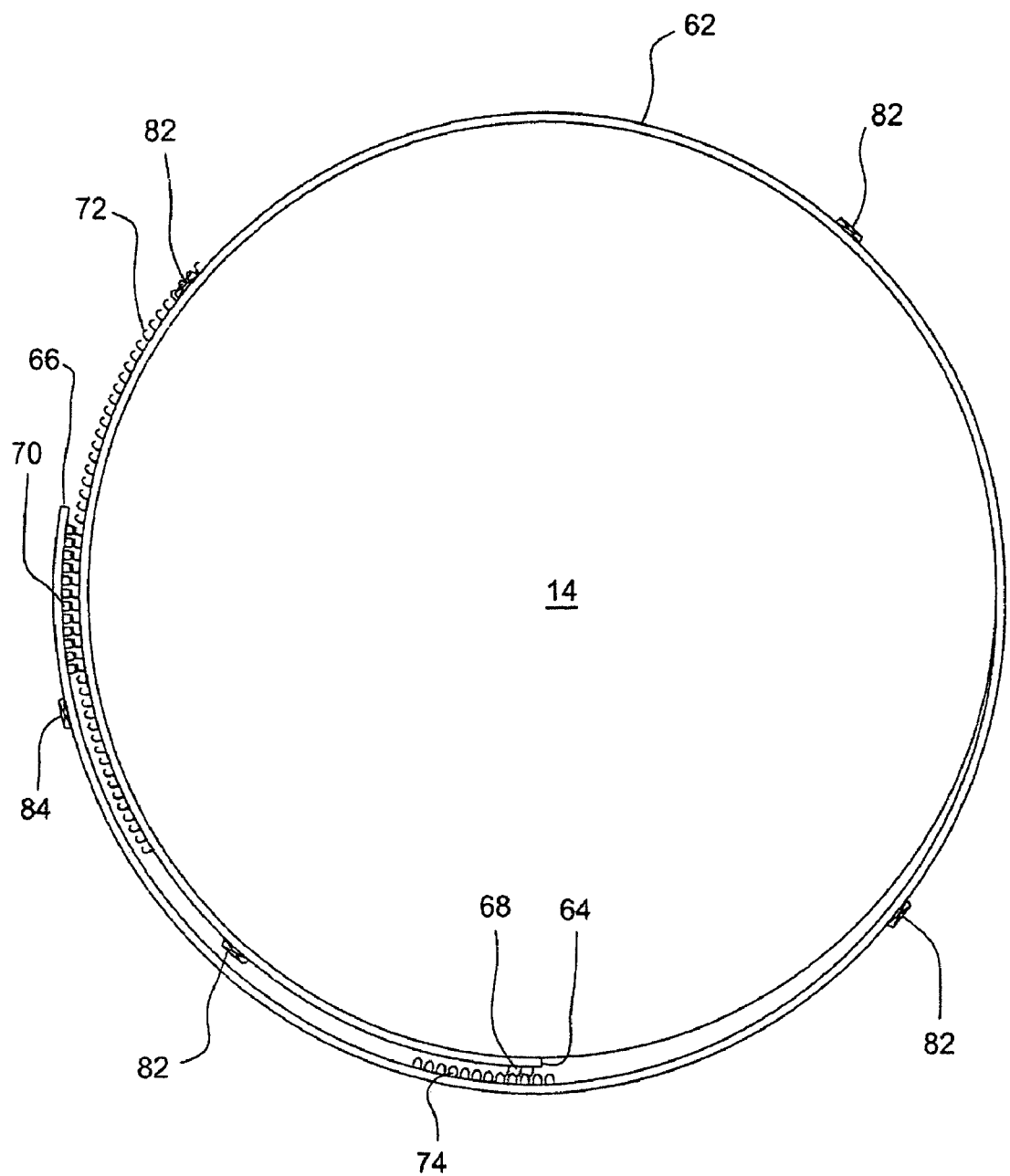
FIG. 5 is a schematic end view of a cylindrical module having a first diameter and being wrapped with a wrapping material section constructed in accordance with the principles of the present invention

Referring now to FIG. 5, there is shown an example wherein the module 14 has a diameter of 7.5' and is the maximum sized module intended to be wrapped by the illustrated wrapping material Section 62, which has a length of 30'. As can be seen at the left side of the figure, the trailing end loop material strip 70 is engaged with the hook material strips 72 so as to hold the wrapping material section 62 tight about the module. It can be seen that the wrapping material 62 overlaps itself over only a slight distance of about 10% of the length L of the wrapping material section 62. It is noted that the RFID tags 82 are dispersed about the circumference of the module 14 such that one of them will always be readable with a reader carried by a module handling device so that the modules 14 can be reoriented. For example, the illustrated module 14 would be reoriented through a clockwise rotation so that the wrapping material trailing end 66 would be at the right side, as viewed in FIG. 5, so that ground water or rain will not tend to run under the end 66.

Figure 6:
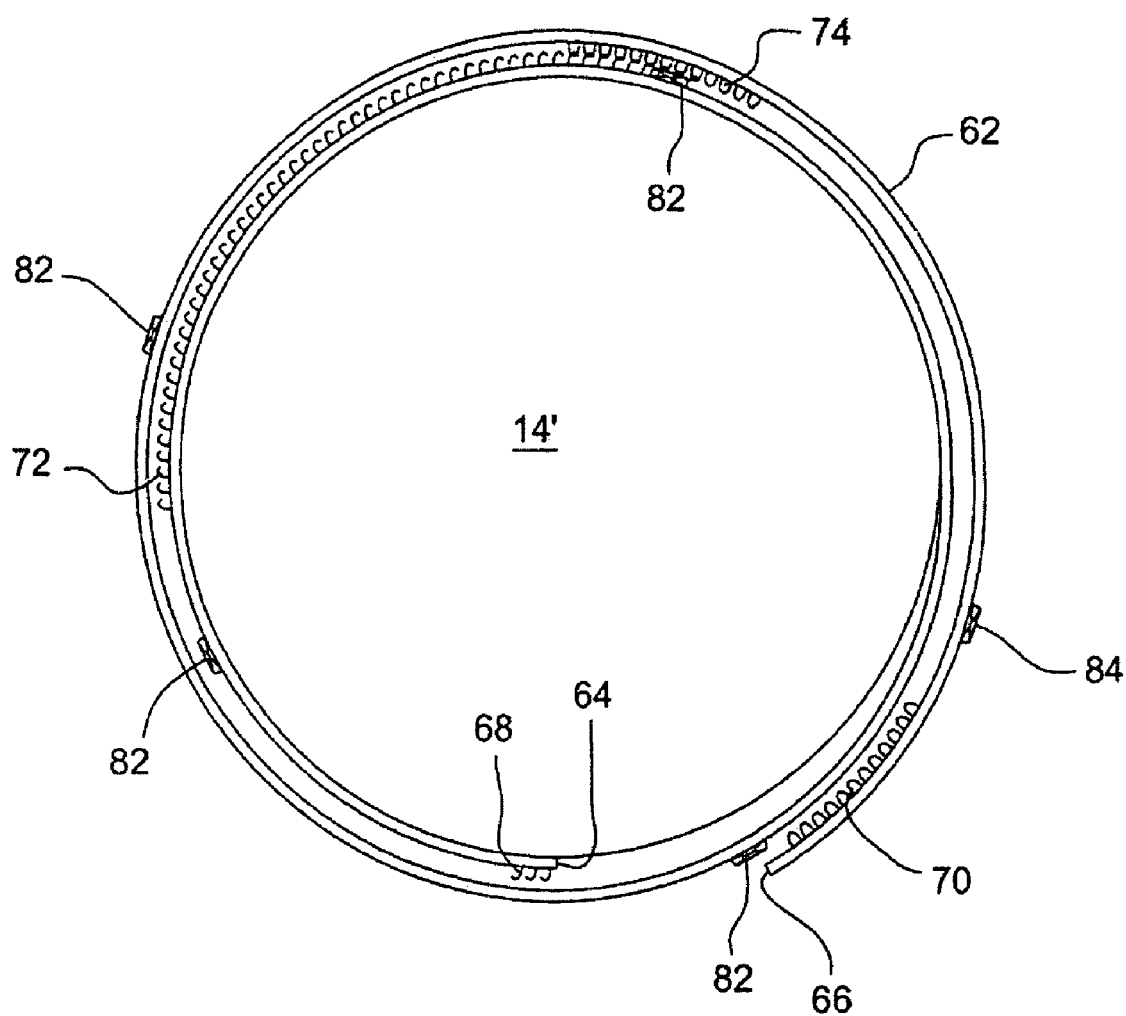
FIG. 6 is a view like that of FIG. 5 but showing a cylindrical module of a minimum size that can be wrapped by the wrapping material section shown in FIG. 5.

Referring now to FIG. 6, there is shown an example wherein a module 14' has a diameter of 5', which is the minimum sized module intended to be wrapped by the illustrated wrapping material section 62, which is 30' long. As can be seen close to the top of the figure, the loop material strip 74 is almost entirely engaged with the strip of hook material 72, with an unattached tail of the wrapping material section 62 extending from the loop material 74 to the trailing end 66, a distance which makes up approximately 18% of the length L of the wrapping material section 62. Further, it is noted that almost two wraps of the wrapping material section 62 are located on the module 14' and that the four RFID tags 82 are dispersed about the circumference of the module 14' such that at Least one tag will be readable by a reader carried by a module handling device so that the module 14' can be reoriented with the end 66 of the wrapping material section 62 being at the bottom of the module 14' so that the module weight bears on the end 66 to maintain the wrapping material section 62 fixed about the module, with it being unlikely that ground or rain water passing under the end 66 will find its way to the module due to the long, uphill section involved.

Having described the preferred embodiment, it will become apparent that various modifications can be made without departing from the scope of the invention as defined in the accompanying claims.

The invention claimed is:

1. A reusable wrapping material section of durable plastic material for wrapping cylindrical cotton modules, comprising: said wrapping material section including a base material consisting of a plastic covered polyester material having a length L, having leading and trailing ends, as considered in a direction of intended feeding of said material into a module-forming chamber, and being of a width to cover substantially an entire width of a module located in said chamber; said wrapping material section including top and bottom sides; an arrangement of hook material being secured to said top side of said wrapping material section only within, and occupying opposite ends of, a leading zone constituting approximately 30% of said length L; a loop material arrangement being fixed to said bottom side of said wrapping material section within, and occupying opposite ends of, a trailing zone constituting 20% of said length L; and said length L being such that said wrapping material section will wrap a circumference of a module, having a maximum diameter intended to be wrapped by said wrapping material section, using no more than 1.25 wraps with the arrangement of hook material engaging the arrangement of loop material, and will wrap a circumference of a module, having a minimum diameter intended to be wrapped by said wrapping material section and equal to approximately ⅔ of said maximum diameter, with no more than two wraps of said wrapping material section being required, with the arrangement of hook material engaging the arrangement of loop material wherein said hook material arrangement includes hook material located within a narrow leading end zone of said leading zone extending across said width of said wrapping material section adjacent said leading end and spaced along the length L of said wrapping material section from a remainder of said hook material arrangement by a distance approximately equal to 13% of the length L of the wrapping material section, with the hook material covering no more than 15% of an area of said narrow leading end zone; and said loop material arrangement including a narrow loop material strip fixed across said width of said wrapping material section in parallel relationship to, and adjacent to said trailing end; said loop material strip having a width at least four times greater than a width of said leading zone, with said narrow loop material strip thus being located for engagement with said hook material located within saki narrow leading zone of an adjacent wrapping material section so as to secure adjacent wrapping material sections together in end-to-end relationship, and being located for engagement with hook material within said remainder of said hook material arrangement for securing said wrapping material section about said maximum sized module.

2. The reusable wrapping material section, as defined in claim 1, wherein said arrangement of loop material includes a second strip of loop material having a width equal to that of said first-mentioned strip, with said second strip of loop material being spaced from said first-mentioned strip by a distance equal to between 15-20% of the length L of said wrapping material section.

3. The reusable wrapping material section, as defined in claim 1, wherein said narrow leading zone of said arrangement of hook material includes, a plurality of evenly spaced squares of hook material having a side equal to a width of said narrow leading zone.

4. A reusable wrapping material section of durable plastic material for wrapping cylindrical cotton modules, comprising: said wrapping material section including a base material consisting of a plastic covered polyester material having a length L, having leading and trailing ends, as considered in a direction of intended feeding of said material into a module-forming chamber, and being of a width to cover substantially an entire width of a module located in said chamber; said wrapping material section including top and bottom sides; an arrangement of hook material being secured to said top side of said wrapping material section only within, and occupying opposite ends of, a leading zone constituting approximately 30% of said length L; a loop material arrangement being fixed to said bottom side of said wrapping material section within, and occupying opposite ends of, a trailing zone constituting 20% of said length L; and said length L being such that said wrapping material section will wrap a circumference of a module, having a maximum diameter intended to be wrapped by said wrapping material section, using no more than 1.25 wraps with the arrangement of hook material engaging the arrangement of loop material, and will wrap a circumference of a module, having a minimum diameter intended to be wrapped by said wrapping material section and equal to approximately ⅔ of said maximum diameter, with no more than two wraps of said wrapping material section being required, with the arrangement of hook material engaging the arrangement of loop material wherein said arrangement of hook material includes hook material located within a narrow zone extending across said wrapping material section adjacent said leading end, and further includes a plurality of hook material strips extending lengthwise of, and being spaced across said width of, said wrapping material section; and said hook material strips having a length of between 15-20% of the length L of the wrapping material section and being spaced from said narrow zone by a distance of between 10-15% of the length L of said wrapping material section.

5. A reusable wrapping material section of durable plastic material for wrapping cylindrical cotton modules, comprising: said wrapping material section including a base material consisting of a plastic covered polyester material having a length L, having leading and trailing ends. as considered in a direction of intended feeding of said material into a module-forming chamber, and being of a width to cover substantially an entire width of a module located in said chamber; said wrapping material section including to and bottom sides; an arrangement of hook material being, secured to said; top side of said wrapping material section only within, and occupying opposite ends of, a leading zone constituting approximately 30% of said length L; a loop material arrangement being fixed to said bottom side of said wrapping material section within, and occupying opposite ends of, a trailing zone constituting 20% of said length L; and said length L being such that said wrapping material section will wrap a circumference of a module, having a maximum diameter, intended to be wrapped, by said wrapping material section, using no more than 1.25 wraps with the arrangement of hook material engaging the arrangement of loop material, and will wrap a circumference of a module, having a minimum diameter intended to be wrapped by said wrapping material section and equal to approximately ⅔ of said maximum diameter, with no more than two wraps of said wrapping material section being required, with the arrangement of hook material engaging the arrangement of loop material wherein said hook material is unidirectional hook material oriented toward said trailing end of said wrapping material section.

6. A reusable wrapping material section of durable plastic material for wrapping cylindrical cotton modules, comprising: said wrapping material section including a base material consisting of a plastic covered polyester material having a length L, having leading and trailing ends, as considered in a direction of intended feeding of said material into a module-forming chamber, and being of a width to cover substantially an entire width of a module located in said chamber; said wrapping material section including top and bottom sides; an arrangement of hook material being secured to said top side of said wrapping material section only within, and occupying opposite ends of, a leading zone constituting approximately 30% of said length L; a loop material arrangement being fixed to said bottom side of said wrapping material section within, and occupying opposite ends of, a trailing zone constituting 20% of said length L; and said length L being such that said wrapping material section will wrap a circumference of a module, having a maximum diameter intended to be wrapped by said wrapping material section, using no more than 1.25 wraps with the arrangement of hook material engaging the arrangement of loop material, and will wrap a circumference of a module, having a minimum diameter intended to be wrapped by said wrapping material section and equal to approximately ⅔ of said maximum diameter, with no more than two wraps of said wrapping material section being required, with the arrangement of hook material engaging the arrangement of loop material wherein said wrapping material section includes tapered leading and trailing end regions.

* * * * *